United States Patent [19]

Thompson

[11] Patent Number: 4,824,232

[45] Date of Patent: Apr. 25, 1989

[54] DRIVE SYSTEM WITH RESILIENT YIELDABLE BIASED ACTUATOR SHAFT FOR ELECTRIC REAR VIEW MIRROR

[75] Inventor: James A. Thompson, Saranac, Mich.

[73] Assignee: Babcock Industries, Inc., Fairfield, Conn.

[21] Appl. No.: 137,070

[22] Filed: Dec. 23, 1987

[51] Int. Cl.$^4$ ............................ B60R 1/06; G02B 7/18
[52] U.S. Cl. ...................................... 350/633; 350/634
[58] Field of Search ............... 350/633, 634, 636, 637; 248/481–484, 487; 74/424.8 R, 424.8 A, 424.8 C

[56] References Cited

U.S. PATENT DOCUMENTS

| | | |
|---|---|---|
| 2,906,292 | 9/1959 | Mayo . |
| 2,953,934 | 9/1960 | Sundt . |
| 3,027,807 | 11/1961 | Barcus et al. . |
| 3,609,014 | 9/1971 | Kurz, Jr. . |
| 4,477,150 | 10/1984 | Usami et al. ........................ 350/627 |
| 4,482,211 | 11/1984 | Fisher ................................. 350/637 |
| 4,695,555 | 9/1987 | Enomoto ............................ 350/634 |

FOREIGN PATENT DOCUMENTS

| | | | |
|---|---|---|---|
| 2840789 | 4/1980 | Fed. Rep. of Germany ...... 350/634 |
| 35933 | 3/1979 | Japan .................................. 350/633 |

Primary Examiner—Jon W. Henry
Attorney, Agent, or Firm—Varnum, Riddering, Schmidt & Howlett

[57] ABSTRACT

A remote control system for a vehicle mirror comprises a pair of drive systems each having a nonrotatable actuator shaft (12) caused to move longitudinally by an internally threaded bore (52) of a pinion gear (14) in driving engagement with a worm gear (16) on a shaft of a motion (18). The actuator shaft (12) is divided by a slot (36) into two end portions (38, 39). The first end portion (38) has a threaded protrusion (42) and the second end portion (39) has an unthreaded protrusion (44). Both end portions additionally spring biased (40). The actuator shaft (12) is made of flexible plastic so that the shaft flexes as the mirror pivots with respect to the motor housing (10).

14 Claims, 4 Drawing Sheets

DRIVE SYSTEM WITH RESILIENT YIELDABLE BIASED ACTUATOR SHAFT FOR ELECTRIC REAR VIEW MIRROR

BACKGROUND OF THE INVENTION

1. Field of the Invention

The present invention relates to drive systems for adjusting the position of remotely controlled electrically operated automotive rear view mirrors, and more particularly to an improved actuator shaft for such drive systems.

2. Description of the Prior Art

The use of electrically operated remote control means to adjust the position of an outside rear view mirror is well known in the art. It is also known, in such control means to use electrically driven rotatable nuts which cause longitudinal nonrotary movement of two screws which engage the backing plate of the mirror to cause it to pivot about each of two mutually perpendicular axes. The rotatable nuts may be driven by either a single motor driven worm gear which selectively pivots into engagement with one or the other of the nuts or by two sets of motors and worm gears.

An override feature is commonly provided by which the motor is permitted to continue to run after the mirror has reached the limit of its movement, or, conversely, the mirror can be manually shifted when the motor is not operating. Such override features have been achieved, for example, by the use of a split nut which permits the nut to rotate without causing longitudinal movement of the screw or permits the screw to move longitudinally without rotation of the nut. The segments of the split nut are resiliently biased in a radially inward direction to normally maintain a driving engagement with the threads of the screw. However, in an overload condition, the nut segments resiliently yield radially outwardly to disengage the driving relationship between the screw and the nut threads. Such a drive system may be found in U.S. Pat. No. 4,041,793.

Alternatively, it is known to use an adjustable screw with threaded segments that are inwardly biased to disengage a rotatable nut in such an overload condition. Exemplary of such an adjustable drive shaft is the drive system found in German Pat. No. 2840789.

It is further known to provide means to adjust the drive mechanism to account for the degree of travel of the mirror along its arc of pivotable movement. U.S. Pat. No. 4,482,211 discloses such an improved system in the use of a three piece assembly comprising a worm gear driven pinion gear having a spherical socket which receives a ball shaped drive nut splined for co-axial rotation with the pinion gear, and internally threaded to receive a screw member having radially inwardly and resiliently yieldable male thread segments. The ball-socket relationship of the pinion gear and nut permit the axis of the nut, and therefore the axis of the screw, to pivot or skew relative to the fixed axis of the pinion gear, while the splined connection between the spherically socketed bore of the pinion gear and the ball shaped exterior of the nut permit uniform simultaneous rotation of such members whether their axis are co-axial or skewed. Thus, the connection of the screw to the mirror can follow the arcuate travel of the mirror as its position is adjusted by the screws, with a smooth and uniform driving relationship irrespective of the angle of the mirror.

The present invention is directed to the creation of an improved and greatly simplified drive system which operates reliably, smoothly, and efficiently.

SUMMARY OF THE INVENTION

In accordance with the invention, a remote control system for a vehicle mirror has an actuator shaft which is made of a resilient yieldable material and has a slot extending from one end thereof to divide the end of the shaft into first and second resilient end portions. Threads are provided on the first end portion of the shaft and means are provided for resiliently biasing the first end portion into engagement with the interior threads of a pinion gear to allow override of the threads at the end of the travel but to otherwise provide firm engagement between the threads on the first end portion of the interior threads of the pinion gears for accurate driving of the actuator shaft.

The actuator is provided typically in a remote control system for controlling a vehicle mirror wherein a mirror is mounted for pivotable movement relative to a motor housing, electric motor means are secured to the housing and a worm gear on an output shaft thereof is driven by the electrical motor. The shaft engages an externally threaded pinion gear rotatably mounted on the motor housing and the pinion gear is also provided with internal threads forming an internal diameter to serve as a nut. The rotation of the worm gear causes a nonrotable mirror-engaging actuator shaft having a first end portion in threaded engagement with the internal threads of the nut to move longitudinally to position the mirror.

The actuator shaft's second end portion is preferably unthreaded and has a means to co-act with the interior of the pinion gear to increase the biasing force on the first end portion against the interior threads of the pinion gear. The unthreaded second end portion has a protrusion on an exterior surface thereof with a diameter slightly greater than the interior diameter of the pinion gear to resiliently bend the second portion inwardly with respect to the center line of the actuator shaft. Also, the first end portion preferably has a protrusion with a diameter slightly greater than the interior diameter of the pinion gear and the threads are formed on the protrusion. Typically, the diameter of the actuator shaft other than the protrusions is slightly less than the interior diameter of the pinion gear so that the shaft is smoothly guided by the interior diameter of the pinion gear. The shaft is preferably formed of a flexible plastic material so that the shaft can flex as the mirror pivots with respect to the motor housing.

In a preferred embodiment of the invention, the principal biasing means comprises a U-shaped spring and the first and second end portions have a U-shaped interior cavity to retain the spring. The spring preferably has outwardly bent end portions at least one of the end portions of the actuator shaft has an aperture extending laterally outwardly into which an end portion of the spring extends to retain the spring in the interior cavity.

BRIEF DESCRIPTION OF THE DRAWINGS

The invention will now be described with reference to the accompanying drawings in which.

DETAILED DESCRIPTION OF THE DRAWINGS

Figure 1:
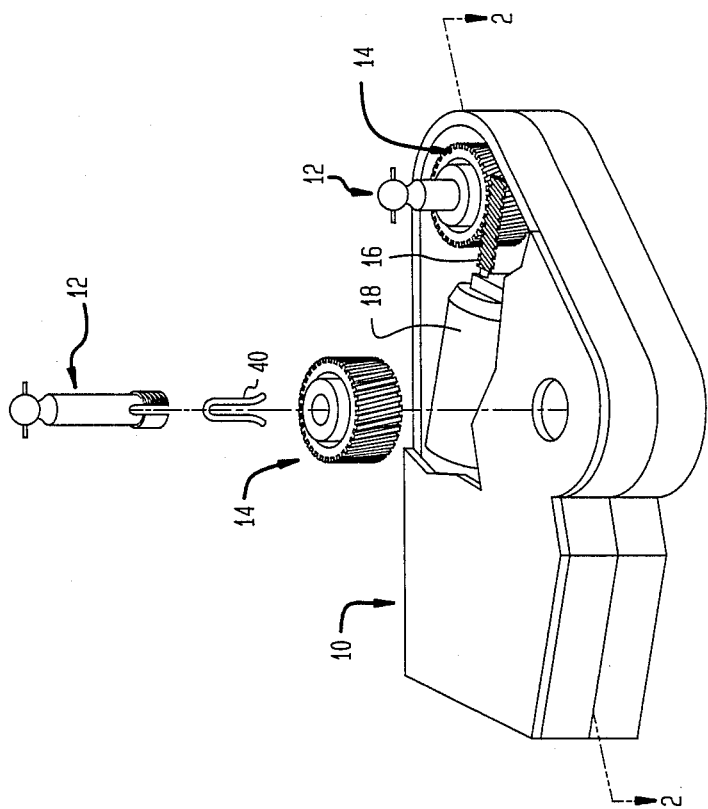
FIG. 1 is a partially exploded perspective view of the motor housing, with a portion of the housing being broken away to reveal one of the two drive systems and with a portion of the other drive system being shown in exploded form.
Figure 2:
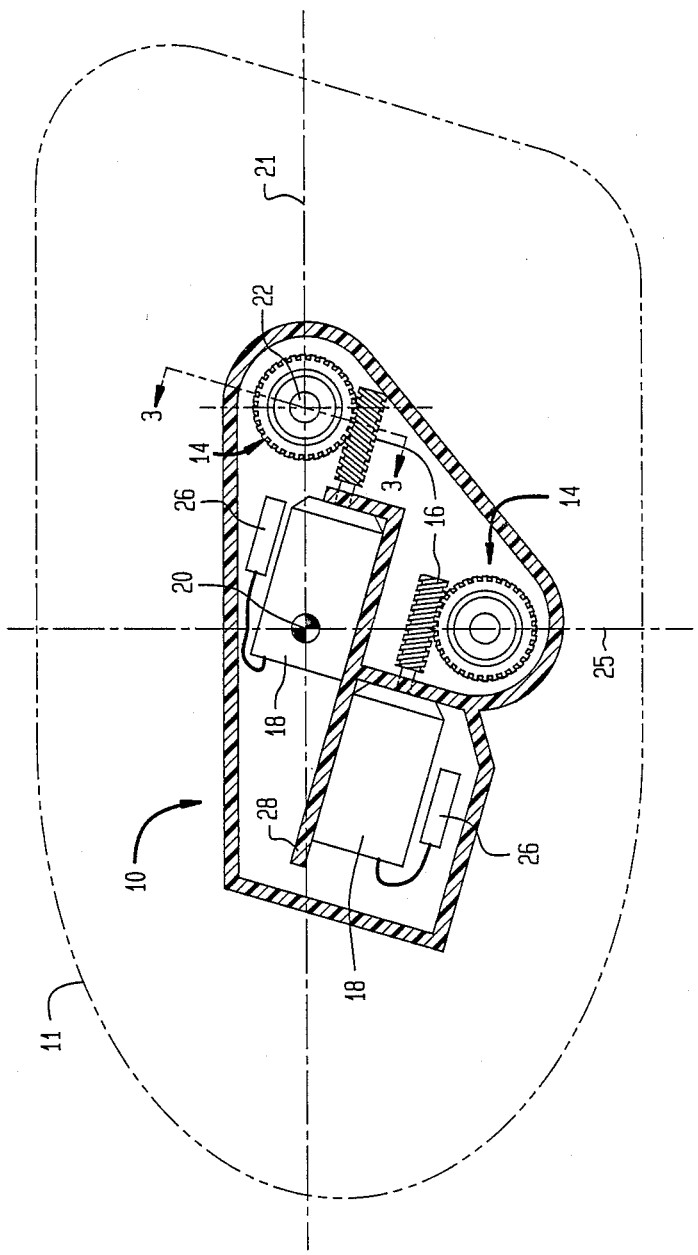
FIG. 2 is a sectional view taken along line 2—2 of FIG. 1 and shown in relation to the mirror housing outlined in phantom with the two pivot axes of the mirror assembly.

Referring first to FIGS. 1 and 2 of the drawings, there is shown a motor housing 10 of a conventional automobile remote control outside rear view mirror (not shown). A mirror housing 11 of the rear view mirror is shown in phantom in FIG. 2. The motor housing 10 contains two identical drive systems. Each drive system comprises an actuator shaft 12 inserted into a pinion gear 14, which engages a worm gear 16 rigidly attached to the shaft of a motor 18, which in turn is secured to the motor housing 10. A pivot point 20 represents the point of universal attachment of the mirror housing 11 to the unillustrated pedestal or base upon which the rear view mirror is conventionally mounted. The mounting is typically a cruciform universal joint. The actuator shaft 12 of each drive system connects nonrotatably to the mirror housing 11 at actuator connection points 22 and 24, respectively, such that the resulting horizontal pivot axis 21 and vertical pivot axis 25 are preferably, but not necessarily, disposed at 90 degree angles relative to each other. A capacitor 26 connected to each motor assists in providing the necessary start up power to drive the mechanism. An interior wall 28 is disposed between the two motors 18 to provide stability and strength, and also to minimize vibration. The actuator shaft 12 of each drive system protrudes through an opening in the motor housing 10.

Figure 3:
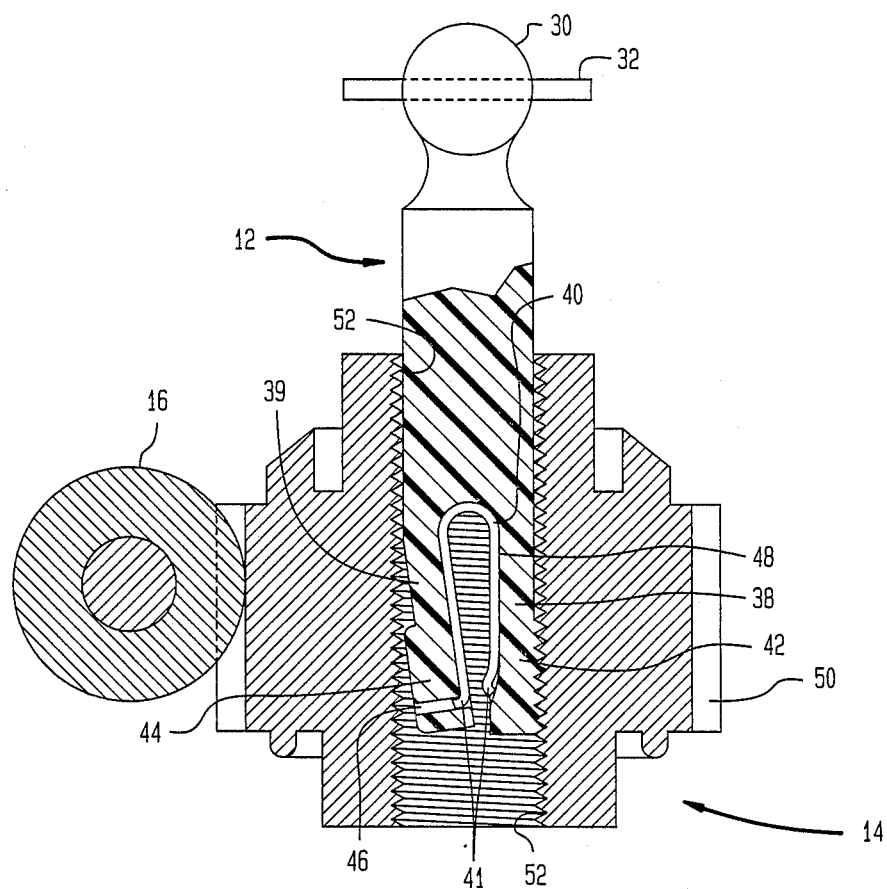
FIG. 3 is a sectional view taken along line 3—3 of FIG. 2.

The pinion gear 14 is rotatably mounted on the motor housing 10. As best shown in FIG. 3, the exterior periphery of the pinion gear 14 is provided with external pinion teeth 50 for driving engagement with the worm gear 16. The pinion gear 14 has an internal threaded bore 52 which is dimensioned to provide radial clearance with the main body 34 of the actuator shaft 12 and thus serve as a nut.

Figure 4:
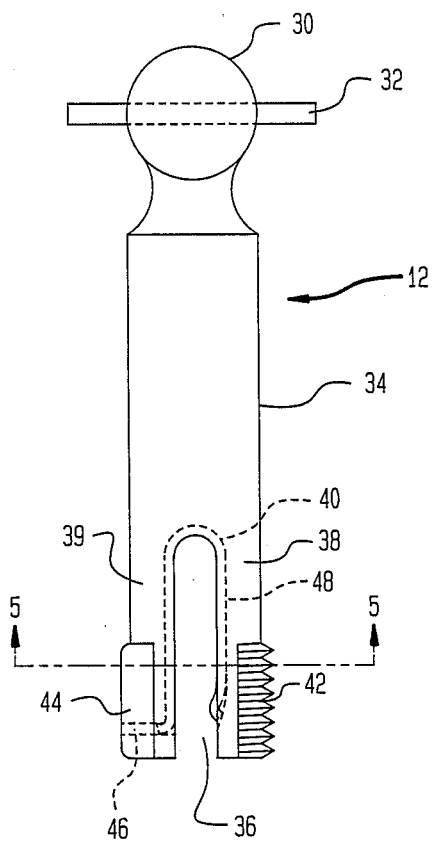
FIG. 4 is a plan elevation of the actuator shaft.
Figure 5:
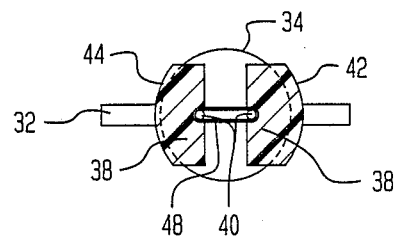
FIG. 5 is a sectional view of the lower end of the actuator shaft, taken along line 5—5 of FIG. 4.

As shown in FIGS. 3, 4 and 5, the actuator shaft 12 comprises a ball 30 at its upper end through which a transverse pin 32 extends. The pin 32, in conventional fashion, establishes a nonrotatable connection between the actuator shaft 12 and a slotted socket in the unillustrated back of the mirror at either of the actuator connection points 22 and 24. At the lower end of the body 34 of the actuator shaft 12, there is an open slot 36 to divide the end of the shaft into first and second resilient end portions 38, 39. The first end portion 38 has a threaded protrusion 42 dimensioned to normally engage the internal threads of the bore 52 of the pinion gear 14. The second end portion 39 has an unthreaded protrusion 44 with a diameter slightly greater than the diameter of the base 52 of the pinion gear 14. In other words, the actuator shaft 12 including each of the first and second end portion protrusions 42,44 has a diameter greater than the interior diameter of the pinion gear 14 when the actuator shaft 12 is in a natural, unbent condition as it would be were it not to be inserted into the pinion gear bore 52, as described hereinafter. An aperture 45 extends laterally outwardly from the slot 36 through the unthreaded protrusion 44. A groove or cavity 48 congruent with the slot 36 is provided on the interior of the end portions 38, 39, adjacent to the slot. 48 extends longitudinally of the slot 36 of the interior of each end portion 38, 39. A U-shaped spring 40 having outwardly bent end portions 41 is disposed within the U-shaped interior cavity 48 of each end portion 38, 39 of the actuator shaft 12. One of the outwardly bent portions 41 of the spring 40 extends into the aperture 46 to secure the spring 40 in the interior cavity 48. Normally, the actuator shaft 12 is received within the bore 52 of the pinion gear 14 where the unthreaded protrusion 44 acting against the threaded bore 52 resiliently bends the second end portion 39 inwardly, thus biasing the threaded protrusion 42 of the first end poriton 38 into threaded engagement with the bore 52. The spring 40 also biases the first and second end portions 38, 39 to yield resiliently inwardly to disengage the threads in an override or overload condition. The main body 34 of the shaft 12 is of a diameter slightly less than interior diameter of the bore 52 so that the shaft 12 is smoothly guided by the interior diameter of the pinion gear 14. The actuator shaft 12 is typically constructed of a flexible plastic material, for example Delrin ®, such that the entire shaft can flex as it extends axially outside the threaded bore 52 of the pinion gear 14.

In operation, selective actuation of one of the motors 18, by conventional means, causes rotation of the associated worm gear 16 which in turn causes pinion gear 14 to rotate. Rotation of the pinion gear 14 causes longitudinal movement of the actuator shaft 12, because pins 32 of the actuator shaft are anchored in slots in the back of the mirror to prevent the actuator shaft 12 from rotating. Such longitudinal movement causes the mirror to pivot about one of its two axes of pivotal freedom, i.e., axis 21 or axis 22 of FIG. 2. As the mirror pivots and the actuator connection point 22 or 24 travels along an arc, the actuator shaft 12 flexes in a direction approximately 90 degrees relative to the engagement of the threaded portion of the actuator shaft 12 with the threaded bore 52 of the pinion gear 14. A smooth and continuous driving relationship is thus assured throughout the travel of the mirror. The threaded protrusion 42 of the first end portion 38 of the shaft 12 does not bind or slip, but remains in continuous threaded engagement.

In the event that the motor controlling switch continues to provide current to the motor 18 after the mirror has reached the limit of its travel, continued rotation of the pinion gear 14 after the actuator shaft 12 can no longer move longitudinally will cause the internal threads of the threaded bore 52 of the pinion gear 14 to resiliently force the threade protrusion 42 of the actuator shaft 12 to yield inwardly against the outward bias of spring 40 and the unthreaded protrusion 44, thereby permitting such continued rotation of the motor 18, the worm gear 16, and the pinion gear 14 without damage to any of the components. Similarly, in the event that the mirror is manually repositioned, while the motor 18 is inoperative, the resulting longitudinal movement of the actuator shaft 12 relative to the non-rotating pinion gear 14 will similarly cause the threaded protrusion 42 of the actuator shaft 12 to resiliently yield in a radially inward direction to disengage the threads and accommodate such relative movement.

Reasonable variation and modification are possible within the scope of the foregoing disclosure and drawings without departing from the scope of the invention.

The embodiments of the invention in which an exclusive property or privilege is claimed are defined as follows:

1. In a remote control system for a vehicle mirror having a mirror mounted for pivotable movement relative to a motor housing, electric motor means secured to the housing and having a worm gear on an output shaft thereof, which shaft engages an externally threaded pinion gear rotatably mounted on the motor housing, and wherein the pinion gear is also provided with internal threads forming an internal diameter to serve as a nut, the rotation of which by the worm gear causes a nonrotatable mirror-engaging actuator shaft having one end in threaded engagement with the internal threads of the nut to move longitudinally to reposition the mirror, the improvement in said actuator shaft which comprises:
   said actuator shaft being made of a yieldable, resilient material;
   a slot extending from said one end of said actuator shaft to divide said shaft one end into first and second resilient end portions;
   threads on said first end portion of said shaft; and
   means resiliently biasing said first end portion into engagement with the interior threads of said pinion gear to allow override of said threads at the end of travel but otherwise to provide firm engagement between said threads on said first end portion and the interior threads of said pinion gears for accurate driving of said actuator shaft;
   wherein said second end portion is unthreaded and has means to co-act with the interior of said pinion gear to increase the biasing force on said first end portion against said interior threads of said pinion gear.

2. A remote control system according to claim 1 wherein the actuator shaft is formed of a flexible plastic material so that the actuator shaft can flex as the mirror pivots with respect to the motor housing.

3. A remote control system according to claim 1 wherein said unthreaded second end portion has a protrusion on an exterior surface thereof, said actuator shaft having a diameter including said protrusion greater than the interior diameter of said pinion gear when said end portions of said actuator shaft are in a natural, unbent condition whereby the second end portion is resiliently bent inwardly with respect to a center line of said actuator shaft when said actuator shaft end portions are within said pinion gear.

4. A remote control system according to claim 3 wherein said first end portion has a protrusion where said actuator shaft has a diameter including said first end protrusion greater than the interior diameter of said pinion gear when said end portions of said actuator shaft are in a natural, unbent condition and said threads are formed on said first end protrusion.

5. A remote control system according to claim 4 wherein said biasing means comprises a U-shaped spring and said first and second end portions having an interior cavity congruent with the slot to retian said spring.

6. A remote control system according to claim 5 wherein said spring has outwardly-bent end portions and said interior cavity has inwardly directed ends at the bottom portion thereof to retain said spring in said interior cavity.

7. A remote control system according to claim 4 wherein the diameter of said actuator shaft other than said protrusions is slightly less than the interior diameter of said pinion gear so that said actuator shaft is smoothly guided by said interior diameter of said pinion gear.

8. A remote control system according to claim 7 wherein said actuator shaft is formed of a flexible plastic material so that said actuator shaft can flex as said mirror pivots with respect to said motor housing. 1

9. A remote control system according to claim 3 wherein the diameter of the actuator shaft other than the protrusions is slightly less than the interior diameter of the pinion gear so that the shaft is smoothly guided by the interior diameter of the pinion gear.

10. A remote control system according to claim 9 wherein said actuator shaft is formed of a flexible plastic material so that said actuator shaft can flex as said mirror pivots with respect to said motor housing.

11. A remote control system according to claim 1 wherein said first end portion has a protrusion where said actuator shaft has a diameter including said first end protrusion greater than the interior diameter of said pinion gear when said end portions of said actuator shaft are in a natural, unbent condition and said threads are formed on said first end protrusion.

12. A remote control system according to claim 11 wherein the diameter of the actuator shaft other than the protrusion is slightly less than the interior diameter of the pinion gear so that said actuator shaft is smoothly guided by the interior diameter of the pinion gear.

13. A remote control system according to claim 12 wherein the actuator shaft is formed of a flexible plastic material so that the actuator shaft can flex as the mirror pivots with respect to the motor housing.

14. A remote control system according to claim 1 wherein said biasing means comprises a U-shaped spring and said first and second end portions have an interior cavity congruent with the slot to retain said spring.

* * * * *

UNITED STATES PATENT AND TRADEMARK OFFICE
CERTIFICATE OF CORRECTION

PATENT NO.   :  4,824,232
DATED        :  April 25, 1989
INVENTOR(S)  :  JAMES A. THOMPSON It is certified that error appears in the above-identified patent and that said Letters Patent is hereby corrected as shown below:

Column 4, line 4, delete "48 extends longitudinally of the slot 36 of the interior of each end portion 38, 39."

Column 4, line 24, "Delrin®," should be --Delrin™,--.

Column 4, line 53, "threade" should be --threaded--.

Signed and Sealed this

Sixteenth Day of January, 1990

*Attest:*

JEFFREY M. SAMUELS

*Attesting Officer*   *Acting Commissioner of Patents and Trademarks*